United States Patent
Killian

(10) Patent No.: US 6,496,745 B1
(45) Date of Patent: Dec. 17, 2002

(54) INTEGRATION OF SELF-LOCATING FEATURE INTO DETAIL PARTS

(75) Inventor: John S. Killian, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/572,807

(22) Filed: May 17, 2000

(51) Int. Cl.⁷ .............................................. G06F 19/00
(52) U.S. Cl. ........................ 700/95; 700/114; 700/117; 244/119; 244/120
(58) Field of Search ............................ 700/57, 95, 114, 700/117; 244/119–120; 29/897.2

(56) References Cited

U.S. PATENT DOCUMENTS

| | | | | |
|---|---|---|---|---|
| 5,106,290 A | * | 4/1992 | Carver et al. ................ | 425/470 |
| 5,560,102 A | * | 10/1996 | Micale et al. ............... | 29/897.2 |
| 5,586,391 A | * | 12/1996 | Micale ....................... | 29/897.2 |
| 5,615,483 A | * | 4/1997 | Micale et al. ............... | 29/897.2 |
| 5,664,311 A | * | 9/1997 | Banks et al. .............. | 29/407.04 |
| 5,694,690 A | * | 12/1997 | Micale ....................... | 29/897.2 |
| 5,715,167 A | | 2/1998 | Gupta et al. | |
| 5,806,797 A | | 9/1998 | Micale | |
| 5,910,894 A | * | 6/1999 | Pryor .......................... | 700/95 |
| 6,003,812 A | * | 12/1999 | Micale et al. ................ | 244/117 |
| 6,170,157 B1 | * | 1/2001 | Munk et al. ................ | 29/897.2 |
| 6,314,630 B1 | * | 11/2001 | Munk et al. ............. | 29/407.01 |

FOREIGN PATENT DOCUMENTS

| | | |
|---|---|---|
| EP | 0 290 809 | 11/1988 |
| WO | WO 97/01802 | 1/1997 |
| WO | WO 97/34733 | 9/1997 |

\* cited by examiner

*Primary Examiner*—Thomas Black
*Assistant Examiner*—Ronald D Hartman, Jr.
(74) *Attorney, Agent, or Firm*—Jackson Walker, L.L.P.

(57) ABSTRACT

The present invention provides systems and methods for orienting or assembling a detailed part in a predetermined orientation in which the detailed part is made up of a plurality of component parts. First, a location and alignment are defined by a virtual assembly tool. Next, a unique combination of self-locating features are disposed on the individual component parts in which the unique combination corresponds to the location and alignment defined by the virtual assembly tool. Thus, the virtual assembly tool is integrated into the assembled detailed part. In practice the individual component parts are engaged with predetermined corresponding component parts using the self-locating features. The act of engaging the individual component-parts is repeated until all component parts are engaged with each respective corresponding component parts.

16 Claims, 5 Drawing Sheets

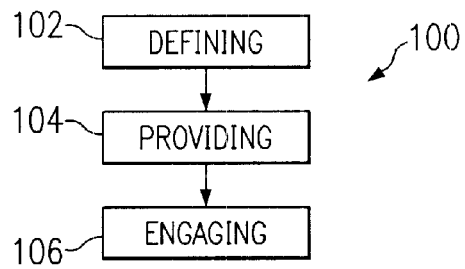
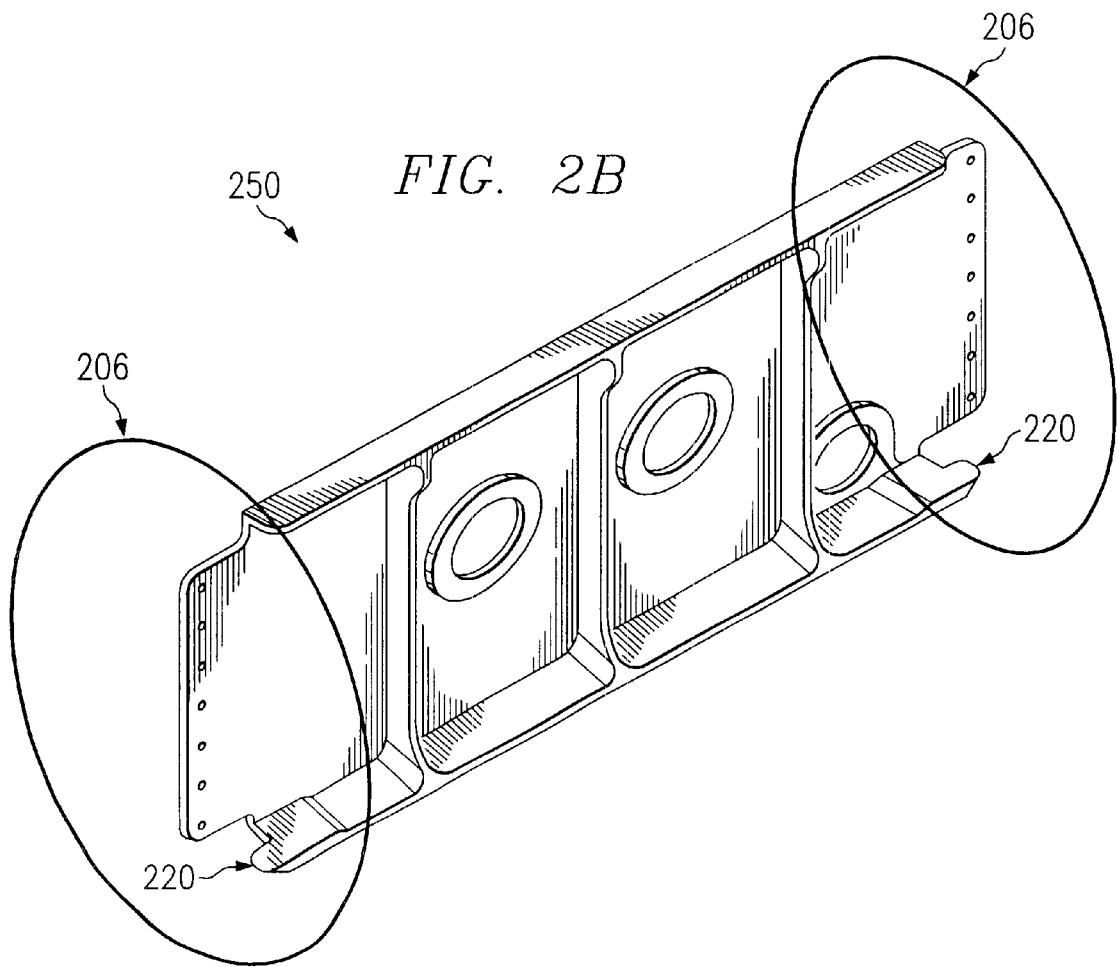

INTEGRATION OF SELF-LOCATING FEATURE INTO DETAIL PARTS

This invention was made with Government support under Contract Number N000194-97-C-0038 awarded by The Department of the Navy. The Government has certain rights in this invention.

BACKGROUND OF THE INVENTION

1. Technical Field of the Invention

The present invention relates generally to assembly techniques, and, more particularly, to systems and methods of integrating an assembly tool into a detailed part.

2. Description of Related Art

Aircraft components are generally unique geometric structures whose design is directly related to the size, payload requirements and purposes of particular aircraft which employ them. Consistent with this uniqueness, the manufacturer of a given aircraft design requires the creation of unique and dedicated tooling typically in the form of assembly jigs and fixtures. Further, such unique tooling and production facilities must be maintained and retain ed over the product ion life span of the aircraft and beyond in anticipation of replacement parts. An aircraft manufacturer that makes a fleet of aircraft must provide and maintain separate tooling and facilities for each different aircraft component (such as the wing, fuselage and tail section). The investment for new tooling and facilities for each new aircraft design commonly exceeds many millions of dollars. For this reason, when a manufacturer is considering a new design or a variation on an existing design, the decision to make the new design or variation is greatly influenced by the sizeable amount of the initial investment required to build new tooling and facilities.

In addition to initial investment, other economic factors associated with current aircraft manufacturing techniques also influence direct labor cost and quality considerations. These economic factors include the degree of automation and accessories used in connection with basic tooling. All of these represent ongoing costs to the manufacturer, which are added over and above the initial investment cost for producing tooling and facilities for any component production.

Assembling and fastening together elements of aircraft components is a multi-step process. For example, the elements of a wing assembly may include an aluminum web, a couple of ankle caps and several stiffeners. Once these elements or details are designed the problem lies in the high man hours requirements needed to prepare and position the elements for assembly and further operations such as automatic fastening, for example, as found in modern aircraft assembly plants. Such a preparation process may also include manual drilling and installation of many temporary fasteners to hold the wing assembly in position, as guided by a jig for that purpose.

Traditional practice was for design to focus on performance requirements with little consideration of how assembly could be accomplished in production. Production depended on tool determinate assembly methods, as above-described, to locate parts in "aircraft" coordinates and make adjustments by shimming or filing at contact areas. These methods lead to work in process laden, station-by-station assembly flow. Reduced tooling assembly methods would support an assembly line perspective by allowing product to flow smoothly through production.

Current emphasis on Lean Manufacturing has initiated the need to develop new methods for streamlining assembly. An innovation of the present invention is the use of part features to locate parts during assembly. Reduced tooling assembly strives to define lean assembly methods which benefit from advances in technology and manufacturing capability by pairing features to achieve assembly location objectives. Projected benefits include reduced assembly tooling and less assembly time.

The above-mentioned and other disadvantages of the prior art are overcome by the present invention, by providing a method and system of integrating an assembly tool into a detailed part and of assembling the detailed parts using self-locating part features.

SUMMARY OF THE INVENTION

The present invention achieves technical advantages as a system and method for orienting or assembling a detailed part in a predetermined orientation in which the detailed part is made up of a plurality of component parts. The method first defines a location and alignment of the component parts. Self-locating features, such as locating tabs, integral flanges, locating notches and locating bosses, are subsequently disposed on the individual component parts corresponding to the defined location and alignment. By disposing a unique combination of self-locating features on component parts of the detailed part, a virtual assembly tool is incorporated into the detailed part. In practice, component parts are engaged with predetermined corresponding component parts using the disposed self-locating feature on each part. Thus, proper location and alignment of each respective part is assured, within a predetermined dimensional tolerance. The act of engaging individual component parts is repeated until each of the component parts is fully located and aligned, using the self-locating features, in the predetermined orientation.

Among the new advantageous of the present invention are: First, integration of self-locating features into detailed part reduces or eliminates the assembly and locating tool counts used to assemble components such as Wing Carry Through components; Second, the integration of self-locating features into the detail parts reduce the assembly span time; Third, reduction or elimination of maintenance requirements of locating and alignment assembly tools and, since tools and time are reduced, consequently, the total cost to assemble the detailed part is reduced.

BRIEF DESCRIPTION OF THE DRAWINGS

For a more complete understanding of the present invention, reference is made to the following detailed description taken in conjunction with the accompanying drawings wherein:

FIG. 1 illustrates a flow chart of a method of orienting a detailed part in a predetermined orientation in accordance with the present invention;

FIG. 2B illustrates a second component part which can be used in accordance with the present invention;

DETAILED DESCRIPTION OF THE INVENTION

Figure 2A:
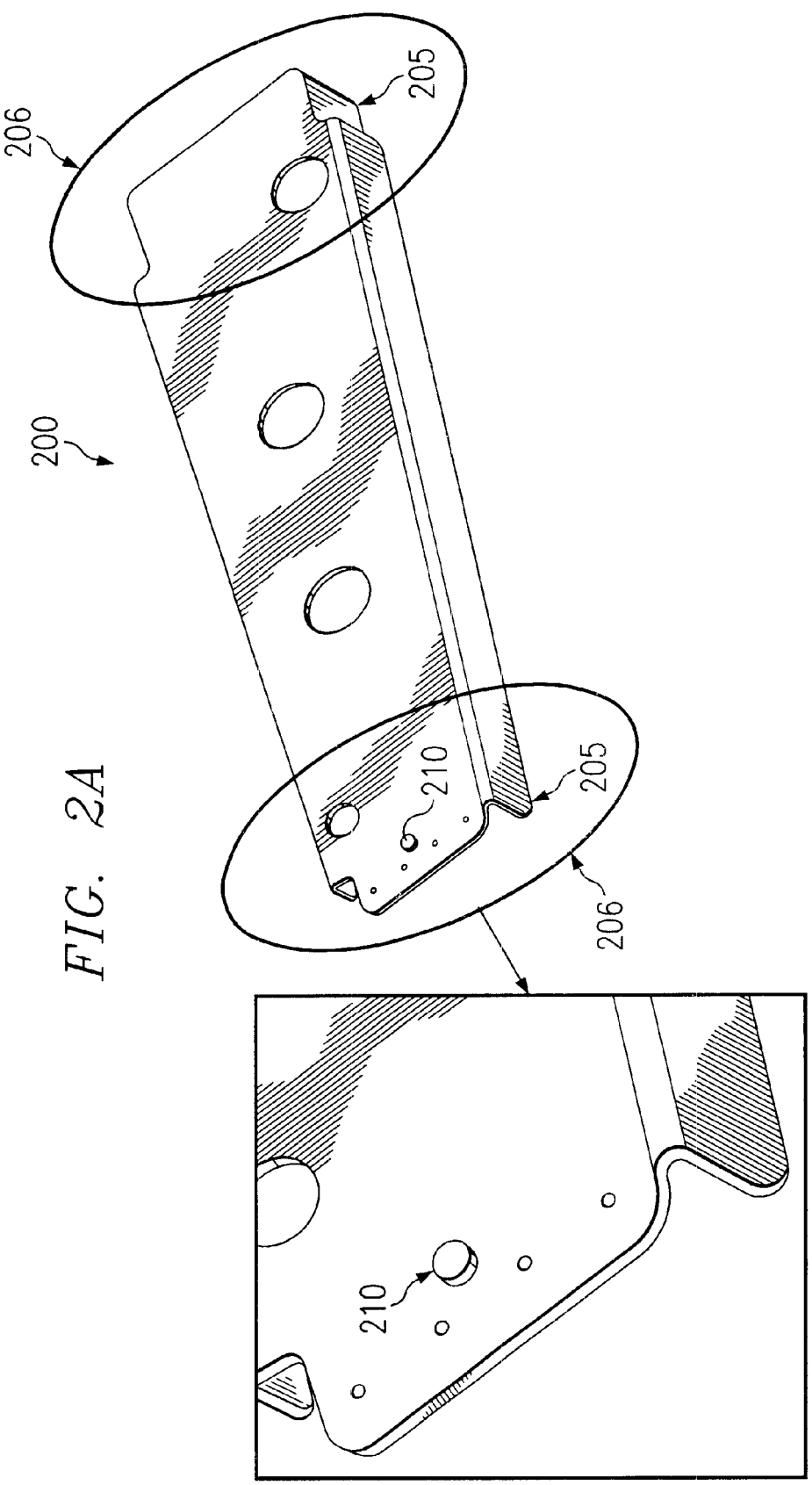
FIG. 2A illustrates a first component part which can be used in accordance with the present invention.

The numerous innovative teachings of the present application will be described with particular reference to the presently preferred exemplary embodiments. However, it should be understood that this class of embodiments provides only a few examples of the many advantageous uses of innovative teachings herein. In general, statements made in this specification of the present application do not necessarily delimit any of the various claimed inventions. Moreover, some statements may apply to some inventive features but not to others.

Referring now to the drawings and more particularly to FIG. 1, there is illustrated a flow chart 100 of a method of orienting a detailed part in a predetermined orientation wherein the detailed part is made up of a plurality of component parts. First, the location and alignment of the component parts are defined 102 in a solid model or virtual model design. The act of defining can be accomplished using a computer graphics aided multi-dimensional interactive application or other innovative tools for multi-dimensional visualization simulation. For the simulation of aircraft sub-assemblies, such as a Wing Carry Through (WCT) assembly, the simulation aids are accurate to dimensional tolerances of at least 0.01 inches.

Next, the component parts are provided 104 or disposed with at least one self-locating feature. Self-locating features are disposed in a unique combination such that engagement of component part mating areas allows for assembly of the detailed part as defined in the act of defining 102. Thus, the simulated or virtual assembly/location tool is designed into the detailed part. Component parts can be designed or provided with self-locating features so that they can only be assembled in one way (that they cannot be reversed or miss located). Finally, the component parts are engaged 106 with corresponding component parts, determined during the act of defining 102, using respective self-locating features. Assembly of all of the component parts results in a detailed part oriented in the predetermined configuration.

Referring now to FIG. 2A, there is illustrated a first component part 200 or rib which can be used in accordance with the present invention. Disposed on the component part 200 are three separate self-locating features which includes one integral flange 205 at each end or mating area 206 and a locating boss 210. The number of self-locating features is for illustrative purposes only, more or less self-locating features can be disposed on a component part.

Referring now to FIG. 2B, there is illustrated a second component part 250 or rib which can be used in accordance with the present invention. The second component part 250 is also shown with two separate self-locating features which include one locating tab 220 at each end or mating area 206. Each of the component parts 200, 250 can have fewer or more self-locating features than are illustrated. Also, the self-locating features are not limited to any specific combination. For example, a component part may accommodate two locating bosses and two locating tabs or one locating boss and one integral flange or some other combination. The simple self-locating features provide guides and verification of location and alignment of each component part when engaged with other component parts.

Figure 3A:
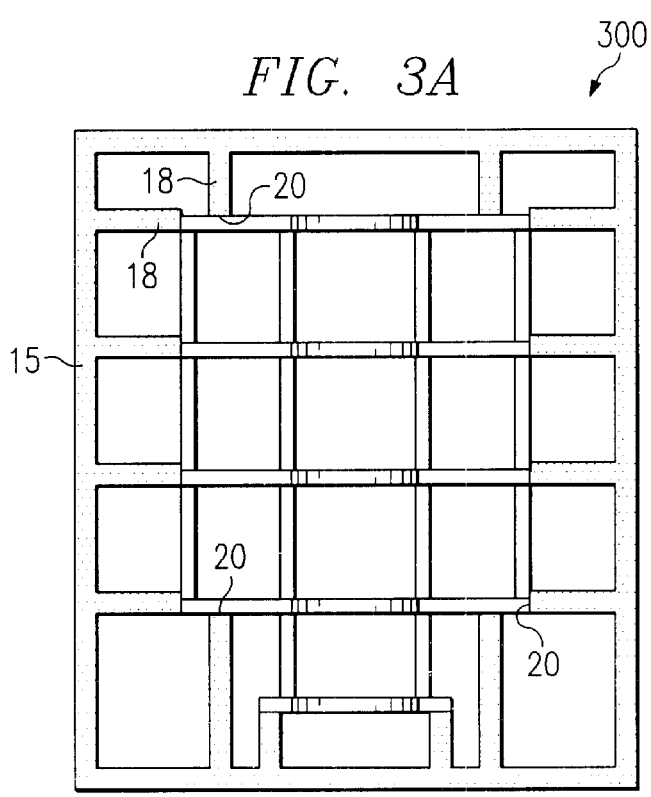
FIG. 3A illustrates a top view of a simplified Wing Carry Through assembly located and aligned by a typical assembly jig.

Referring now to FIG. 3A, there is illustrated a top view of a simplified combination 300 WCT assembly and assembly jig. The simplified WCT assembly is located and aligned by the simplified assembly jig 15 identified by the cross-hatched area. After being located and aligned, the component parts of the simplified WCT assembly can be fastened together using rivets or similar technology known in the art. Generally, the simplified assembly jig 15 is a tool that is manufactured or built to specific dimensional tolerances and is typically made from steel or similar materials. A separate assembly jig is required for each unique detailed part to be assembled and requires continual calibration and maintenance to assure the dimensional integrity. For example, a WCT assembly requires a first assembly jig, a wing assembly requires a second assembly jig, and a tail assembly requires a third assembly jig. Each jig is unique and is separately calibrated and maintained during the production life span of the aircraft. Further, each separate aircraft sub-assembly requires its own assembly jig. The simplified assembly jig 15 shown is only a two dimensional structure, however, additional layers or dimensions can be added to the assembly jig to allow the capability-to locate and align more complex assembly structures.

Assembly jigs currently used are typically made up of structural supports 18 and contact locators 20. Each contact locator 20 is designed to locate and align an assembly component with respect to other assembly components of a WCT assembly, for example. IA contact locator 20 is disposed in the location in which the assembly jig 15 contacts an assembly component. The contact locator 20 can be a pin which mates into a matching hole disposed on an assembly component or other similar type of locating and aligning arrangement known in the art.

Figure 3B:
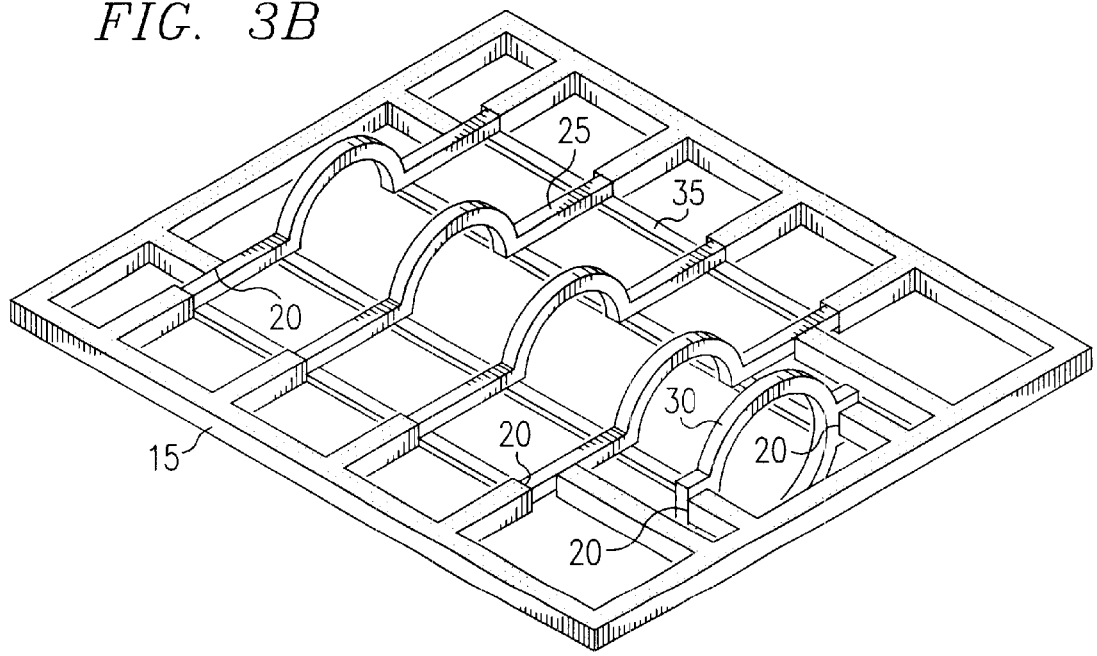
FIG. 3B illustrates a perspective view of a simplified Wing Carry Through assembly located and aligned by a typical assembly jig.

Referring now to FIG. 3B, there is illustrated a perspective view of the simplified combination 300 WCT assembly located and aligned by the simplified assembly jig 15 identified by the cross hatched area. The simplified WCT assembly is made up of individual components which include longitudinal supports 35 or ribs and latitudinal supports 25 and head supports 30. The simplified WCT assembly can also include other structural support components (not shown). Currently technology locates and aligns each longitudinal 35, latitudinal 25, and head support 30 by use of hard assembly tools such as the simplified assembly jig 15. Note that the longitudinal supports 35 do not appear to be located and aligned by the simplified assembly jig 15 depicted, other spacial aspects (not shown to simplify the drawing) of the simplified assembly jig 15 are required for such application. Additionally, the assembly jig 15 must be constructed so that a complete assembled detailed part, which has component parts temporarily or permanent attached, can be removed without damage to the detailed part or assembly jig 15.

Figure 4A:
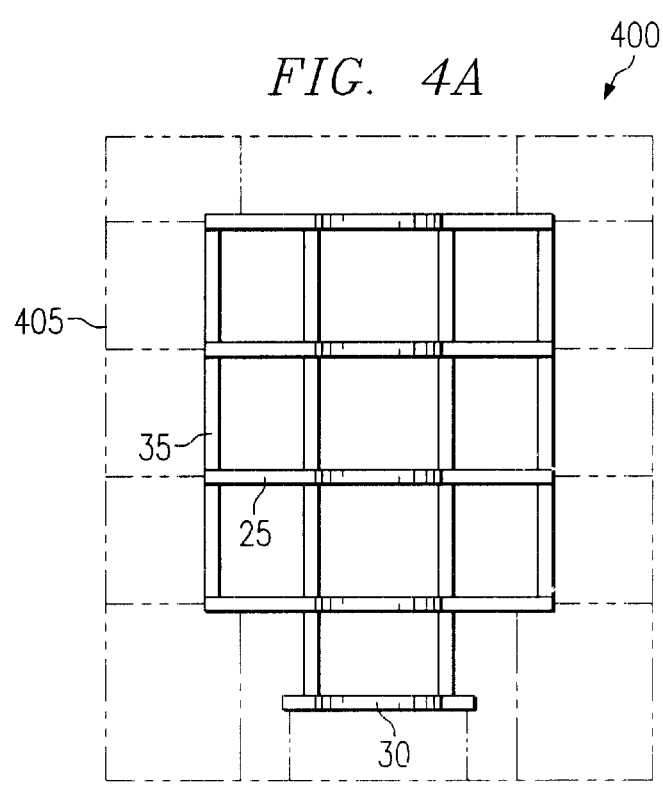
FIG. 4A illustrates a top view of a simplified Wing Carry Through assembly located and aligned by a virtual assembly jig in accordance with the present invention.

Referring now to FIG. 4A, there is illustrated a top view of the simplified combination 400 WCT assembly and virtual assembly jig 405. The simplified WCT assembly is located and aligned by the simplified virtual assembly jig 405 identified by the dashed lines. The simplified virtual assembly jig 405 represents and replaces the hard tool assembly jig 15 (FIG. 3a). Thus, a hard tool assembly jig is simplified from the assembly process of the WCT assembly in accordance with the present invention. The assembly methods of the present invention is not limited to only the WCT assembly but can be used to assemble other large structural detailed parts. Note that the simplified virtual assembly jig 405 shown is only a two dimensional representation, however, additional layers or dimensions can be added to allow the capability to locate and align more complex assembly structures. Note further that the longitudinal supports 35 do not appear to be located and aligned by the simplified virtual assembly jig 405, other spacial aspects are no longer required because self-locating features are now integrated into the longitudinal supports. Further, the virtual assembly jig 405 can be defined by using a computer graphics aided multi-dimensional interactive application or other similar tools for multi-dimensional visualization.

Figure 4B:
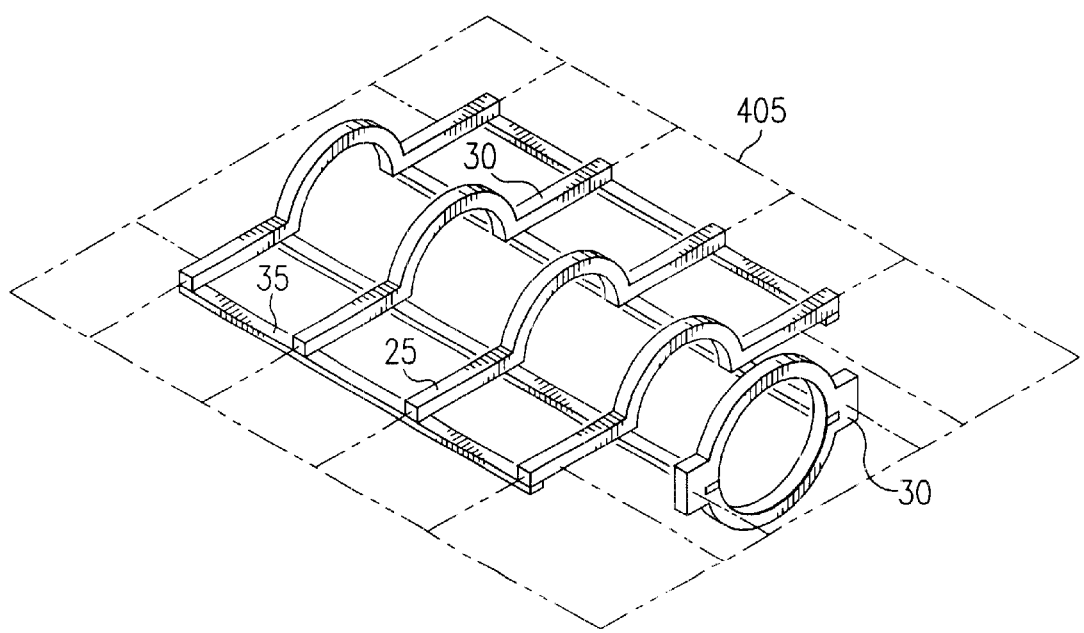
FIG. 4B illustrates a perspective view of a simplified Wing Carry Through assembly located and aligned by a virtual assembly jig in accordance with the present invention.

Referring now to FIG. 4B, there is illustrated a perspective view of the simplified 400 WCT assembly located and aligned by the simplified virtual assembly jig 405 identified by the dashed lines. Note that the simplified virtual assembly jig 405 shown is only a two dimensional representation, however, additional layers or dimensions can be added to allow the capability to locate and align more complex assembly structures. Note further that the longitudinal supports 35 do not appear to be located and aligned by the simplified virtual assembly jig 405. Again, other spacial aspects are no longer required because self-locating features are now integrated into the longitudinal supports.

Figure 5:
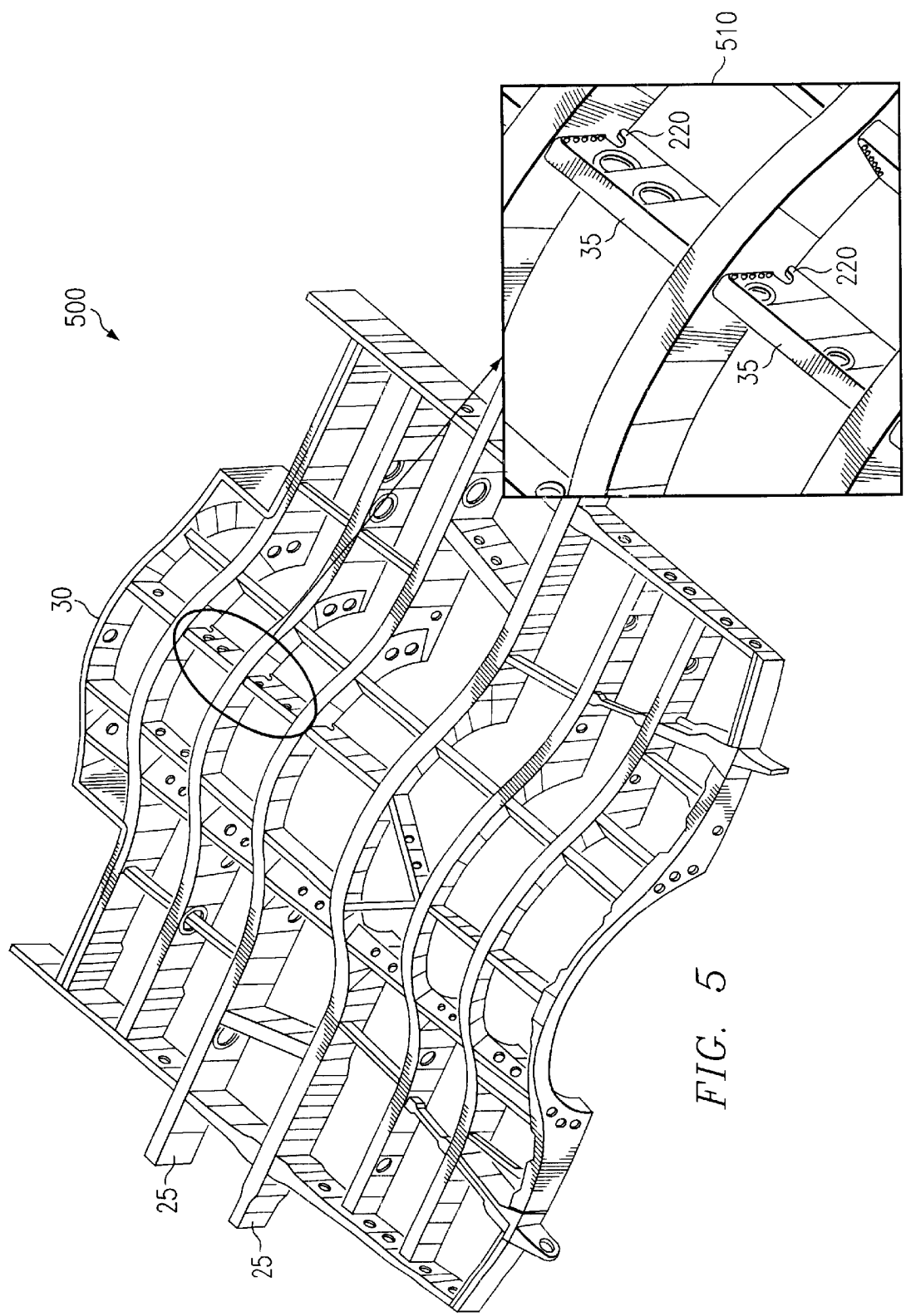
FIG. 5 illustrates a perspective view of a detailed Wing Carry Through assembly with an exploded view of two component parts located and aligned by self-locating tabs in accordance with the present invention.

Referring now to FIG. 5, there is illustrated a perspective view of a detailed WCT assembly 500 with an exploded view 510 of two component parts located and aligned by self-locating tabs 220 in accordance with the present invention. Each component part of the detailed WCT assembly 500 can be located and aligned by a virtual assembly tool as above-described. Subsequent to defining a virtual assembly jig, the component parts are fabricated with self-locating features. The combination of self-locating features are chosen such that each component part mating area can be engaged with a corresponding component part mating area for location and alignment as determined by the virtual assembly jig. Self-locating features include, but are not limited to, flanges, notches, bosses, and tabs. A component part can have multiple self-locating features.

Subsequent to defining the WCT assembly and disposing self-locating features on the component parts, the WCT assembly process can begin with the loading of major frames into, for example, an assembly fixture (not shown). Major frames include the latitudinal 25 and head supports 30. The major frames fit onto simple locators designed to accommodate multiple structural assemblies. Build up of the entire WCT structure can be performed on these low costs multi-fixtures which can later be moved to other assembly stations such as automated drilling or subsystem installation. Longitudinal components 35 or ribs are easily located and clamped into place as aided by the self-locating features designed directly into the part. These self-locating features essentially put the tool into the part, resulting in the elimination of most or all tools that have traditionally been used to locate and align parts at this assembly stage.

Build up of the entire WCT structure continues until each component part is positioned and readied for further processing, such as substructure drilling and fastening. The actual structural assembly loading can required less than one hour compared to several days for this operation using traditional assembly methods. Additionally, the assembly fixture may be loaded by hand, robotic means or a combination of the above-mentioned methods. Primary cost reduction achievements resulting from use of the present invention was a 98% reduction in assembly span time for jig loading resulting from such factors as self-locating parts and smart design. Actual assembly times were compared to Industrial Engineering estimates for similar types of parts and overall structure shape. The self-locating features eliminated the need for tools typically used to emulate the complex contour of the aircraft structure.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method of orienting a detailed part in a predetermined orientation, wherein the detailed part comprises a plurality of components, comprising:

integrating a virtual assembly tool into said detailed part, said virtual assembly tool having an effect of a jig defining a location and alignment of said plurality of components;

providing said plurality of components with at least one self-locating feature, wherein a combination of self-locating features corresponds to said defined location and alignment; and engaging said plurality of components using said combination of self-locating features for effectuating said virtual assembly tool independent of a jig tool.

2. The method of claim 1 further comprising the act of repeating said act of engaging until each of said plurality of components is engaged with predetermined corresponding components using said self-locating feature.

3. The method of claim 1, wherein said self-locating feature comprises one of the group of a locating tab, integral flange, locating notch or locating boss.

4. The method of claim 1, wherein said act of integrating is provided by a computer aided multi-dimensional application.

5. The method of claim 1, wherein said detailed part comprises a Wing Carry Through assembly and said components comprise longitudinal supports, latitudinal supports and head supports.

6. A system of integrating a virtual assembly tool into a detailed part comprising a plurality of component parts, said plurality of component parts each having at least one mating area, comprising:

means for defining said virtual assembly tool, said virtual assembly tool determines a location and alignment of said plurality of component parts in a predetermined orientation;

means for disposing at least one self-locating feature on said plurality of component parts, wherein a combination of disposed self-locating features correspond to said defined virtual assembly tool; and means for engaging said mating areas directed by said disposed self-locating features for effectuating said virtual assembly tool independent of a jig tool and being an integral part of the engaged detailed part and having an effect of a jig tool.

7. The system of claim 6, wherein said self-locating feature comprises one of the group of a locating tab, integral flange, locating not and/or locating boss.

8. The system of claim 6, wherein said means for defining comprises a computer aided multi-dimensional application.

9. The system of claim 6, wherein said disposed self-locating features further allows for engagement of said mating areas within a predetermined dimensional tolerance.

10. The system of claim 6, wherein said detailed part comprises an aircraft sub-assembly.

11. The system of claim 10, wherein said component parts comprise longitudinal supports, latitudinal supports and head supports.

12. A system of integrating a virtual assembly tool into a detailed part comprising a plurality of component-parts, said plurality of component parts each having at least one mating area, comprising:

a computer having a multi-dimensional visualization application defining said virtual assembly tool, said virtual assembly tool determines a location and alignment of said plurality of component parts in a determined orientation, said virtual assembly tool being an integral part of the detailed part;

self-locating features advantageously disposed on said plurality of component parts providing guides and verification of location and alignment of each component part for the determined orientation, wherein.a combination of self-locating features effectuates said virtual assembly tool independent of a jig tool when said mating areas are engaged.

13. The system of claim 12, wherein said self-locating features comprise one of the group of a locating tab, integral flange, locating notch or locating boss.

14. The system of claim 12, wherein said disposed self-locating features further enables engagement of said mating areas within a predetermined dimensional tolerance.

15. The system of claim 12, wherein the detailed part comprises an aircraft sub-assembly.

16. The system of claim 12, wherein engagement of said component parts into the detailed part is independent of a jig tool.

* * * * *